United States Patent
Sasscer et al.

(10) Patent No.: US 9,365,295 B2
(45) Date of Patent: Jun. 14, 2016

(54) ELECTROMECHANICAL ACTUATOR AND LATCH ASSEMBLY FOR RAM AIR TURBINE

(75) Inventors: Gary Sasscer, Leaf River, IL (US); Richard Schweighart, Rockford, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 994 days.

(21) Appl. No.: 13/490,062

(22) Filed: Jun. 6, 2012

(65) Prior Publication Data
US 2013/0330121 A1 Dec. 12, 2013

(51) Int. Cl.
*B64D 41/00* (2006.01)

(52) U.S. Cl.
CPC .......... *B64D 41/007* (2013.01); *Y10T 403/595* (2015.01)

(58) Field of Classification Search
CPC .......... B64D 1/06; B64D 1/16; B64D 41/007; F03D 9/00; F16D 1/00; F16D 1/12; F01D 25/28; Y10T 403/32254; Y10T 403/32262; Y10T 403/32271
See application file for complete search history.

(56) References Cited

U.S. PATENT DOCUMENTS

| | | | |
|---|---|---|---|
| 4,676,458 A | 6/1987 | Cohen | |
| 4,717,095 A * | 1/1988 | Cohen | B64D 41/007 244/58 |
| 5,123,614 A | 6/1992 | Whitehouse | |
| 5,398,780 A | 3/1995 | Althof et al. | |
| 8,070,094 B2 | 12/2011 | Collins | |
| 8,123,161 B1 | 2/2012 | Collins | |
| 2005/0127636 A1* | 6/2005 | Czysz | B62K 21/02 280/276 |
| 2012/0110821 A1 | 5/2012 | Callaghan | |

FOREIGN PATENT DOCUMENTS

WO        87/02642        5/1987

OTHER PUBLICATIONS

U.S. Appl. No. 13/167,801, filed Jun. 24, 2011, "Electromechanical Actuator Driven Governor for Ram Air Turbine".

* cited by examiner

*Primary Examiner* — Daniel Wiley
(74) *Attorney, Agent, or Firm* — Carlson, Gaskey & Olds, P.C.

(57) ABSTRACT

A latch assembly for a RAT actuator includes a lever block having spaced apart first and second lateral walls interconnected to one another by a bridge wall. The first and second lateral walls provide a pivot axis at one end. A latch pin is at another end opposite the one end. The latch pin extends between the first and second lateral walls. A latch bearing is arranged in each of the first and second lateral walls. Each bearing receives an end of the latch pin and is configured to permit the latch pin to rotate relative to the lever block. A lever block is arranged within a housing and has first and second lateral walls interconnected to one another by a bridge wall. A solenoid is configured to push the lever block about the pivot axis during a deploy sequence.

15 Claims, 4 Drawing Sheets

ELECTROMECHANICAL ACTUATOR AND LATCH ASSEMBLY FOR RAM AIR TURBINE

BACKGROUND

This disclosure relates to an electromechanical actuator latch system used for a ram air turbine (RAT), for example.

A typical hydraulic RAT actuator includes a piston rod nested within and movable relative to a cylinder. In one example actuator, the piston rod is affixed to a housing, and the cylinder is free to slide. The cylinder moves telescopically with respect to the piston rod during a deploy sequence. The deploy sequence is initiated by triggering a latch assembly with a solenoid, thus unlocking the cylinder from the piston rod. The solenoid includes a rod that travels a small distance under reduced electrical power.

The actuator and its components are under very high stresses, and the components are designed to operate under high G-loads. Thus, the latch assembly must stay in the latched position until acted upon by the solenoid.

SUMMARY

In one exemplary embodiment, a latch assembly for a RAT actuator includes a lever block having spaced apart first and second lateral walls interconnected to one another by a bridge wall. The first and second lateral walls provide a pivot axis at one end. A latch pin is at another end opposite the one end. The latch pin extends between the first and second lateral walls. A latch bearing is arranged in each of the first and second lateral walls. Each bearing receives an end of the latch pin and is configured to permit the latch pin to rotate relative to the lever block.

In another exemplary embodiment, a latching system for a RAT actuator includes a housing. A lever block is arranged within the housing and has first and second lateral walls interconnected to one another by a bridge wall. The first and second lateral walls provide a pivot axis at one end. The lever block provides a deploy surface. A latch pin is at another end opposite the one end. The latch pin extends between the first and second lateral walls. A solenoid is mounted to the housing and includes a rod having an end that engages the deploy surface. The solenoid is configured to push the lever block about the pivot axis during a deploy sequence.

BRIEF DESCRIPTION OF THE DRAWINGS

The disclosure can be further understood by reference to the following detailed description when considered in connection with the accompanying drawings wherein.

DETAILED DESCRIPTION

Figure 1:
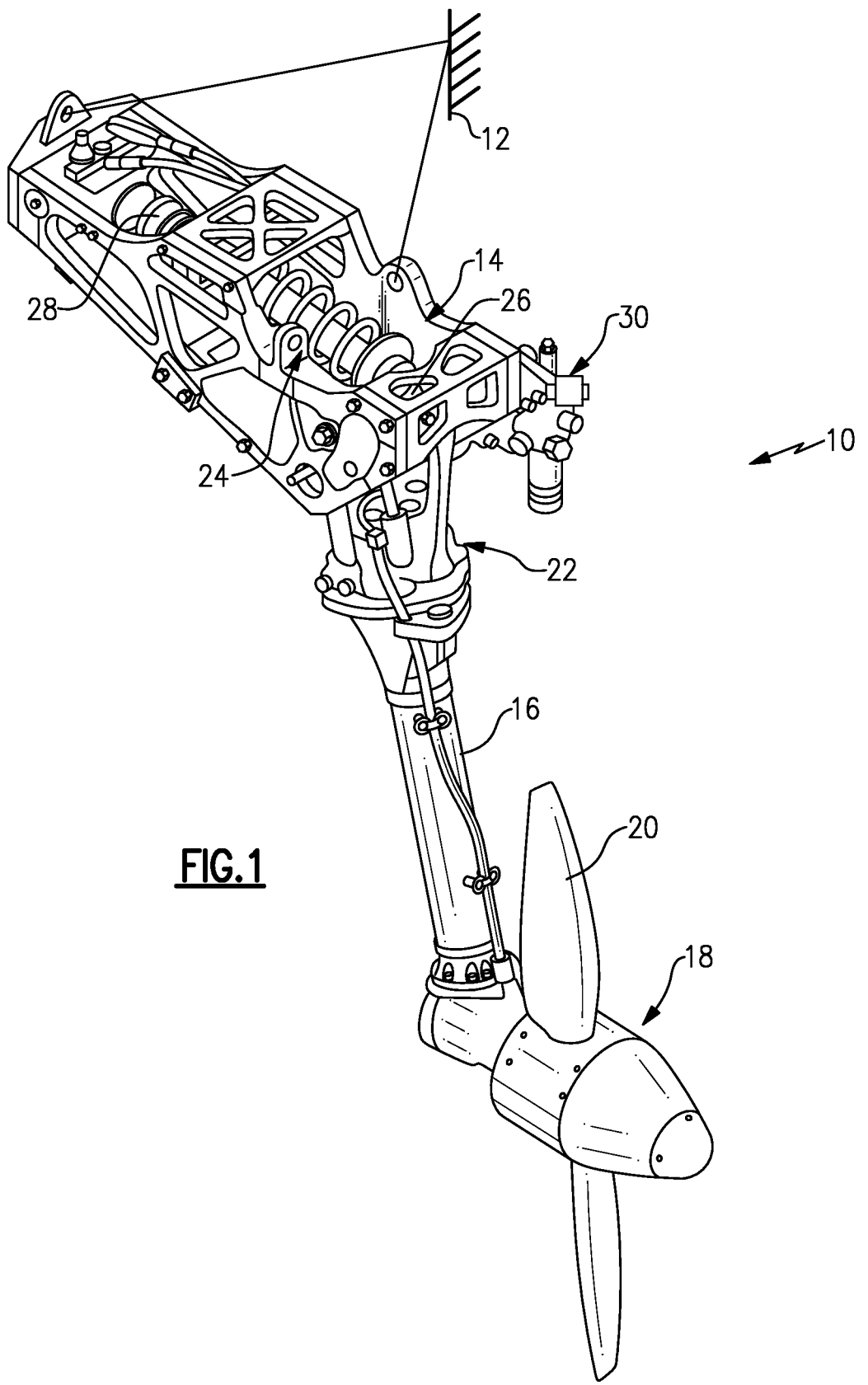
FIG. 1 is a perspective view of a RAT system in a deployed position.

FIG. 1 illustrates a RAT system 10 secured to an aircraft structure 12 by a housing 14. The housing 14 pivotally supports a strut 16 having a turbine 18 at one end. The turbine 18 includes blades 20, which impart rotational drive to a generator 22 and a hydraulic pump 30, for example. An actuator 24 is secured to the strut 16 at a first end 26 and to the housing at a second end 28. The actuator 24 is illustrated in its deployed position.

Figure 2:
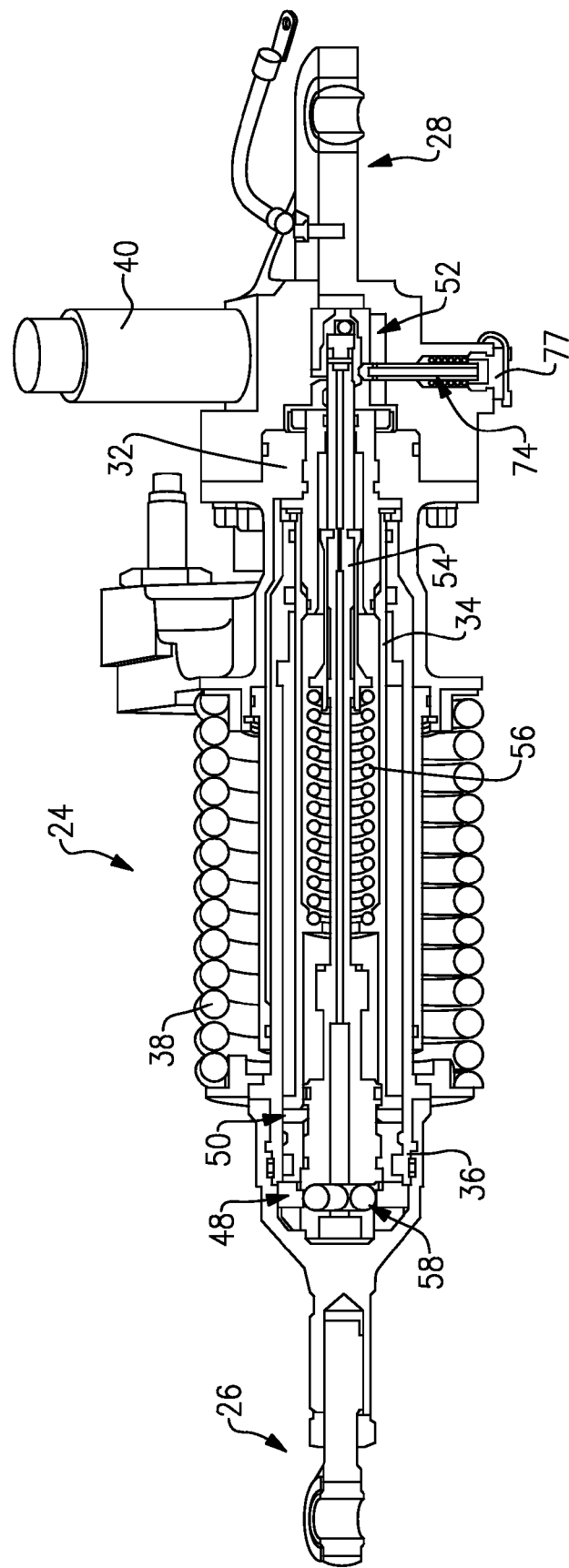
FIG. 2 is a cross-sectional view of an actuator illustrated in FIG. 2, but in a retracted position.

Referring to FIG. 2, the actuator 24 includes a housing 32 having a piston rod 34 and a cylinder 36, unattached to housing 32, telescopically arranged relative to one another. A deploy spring 38 is arranged between the housing 32 and the cylinders 36 in a compressed state with the actuator 24 in its retracted position, shown in FIG. 2. The piston rod 34 is affixed to the housing 32, and the cylinder 36 is arranged to slide over the piston rod 34.

The piston rod 34 supports up-lock and down-lock wedges 48, 50. A latch assembly 52 is provided in the housing 32 near a deploy solenoid 40 that is mounted on the housing 32. The latch assembly 52, immersed in hydraulic fluid, is triggered by the solenoid 40 to initiate a deploy sequence. In the example, a pair of solenoids 40 is used for redundancy. A lock bolt 54 is arranged slideably within the piston rod 34 to actuate up-lock and down-lock wedges 48, 50 during the deploy sequence. A roller assembly 58 is supported by the lock bolt 54 and arranged radially inward of the up-lock wedges 48.

Figure 3:
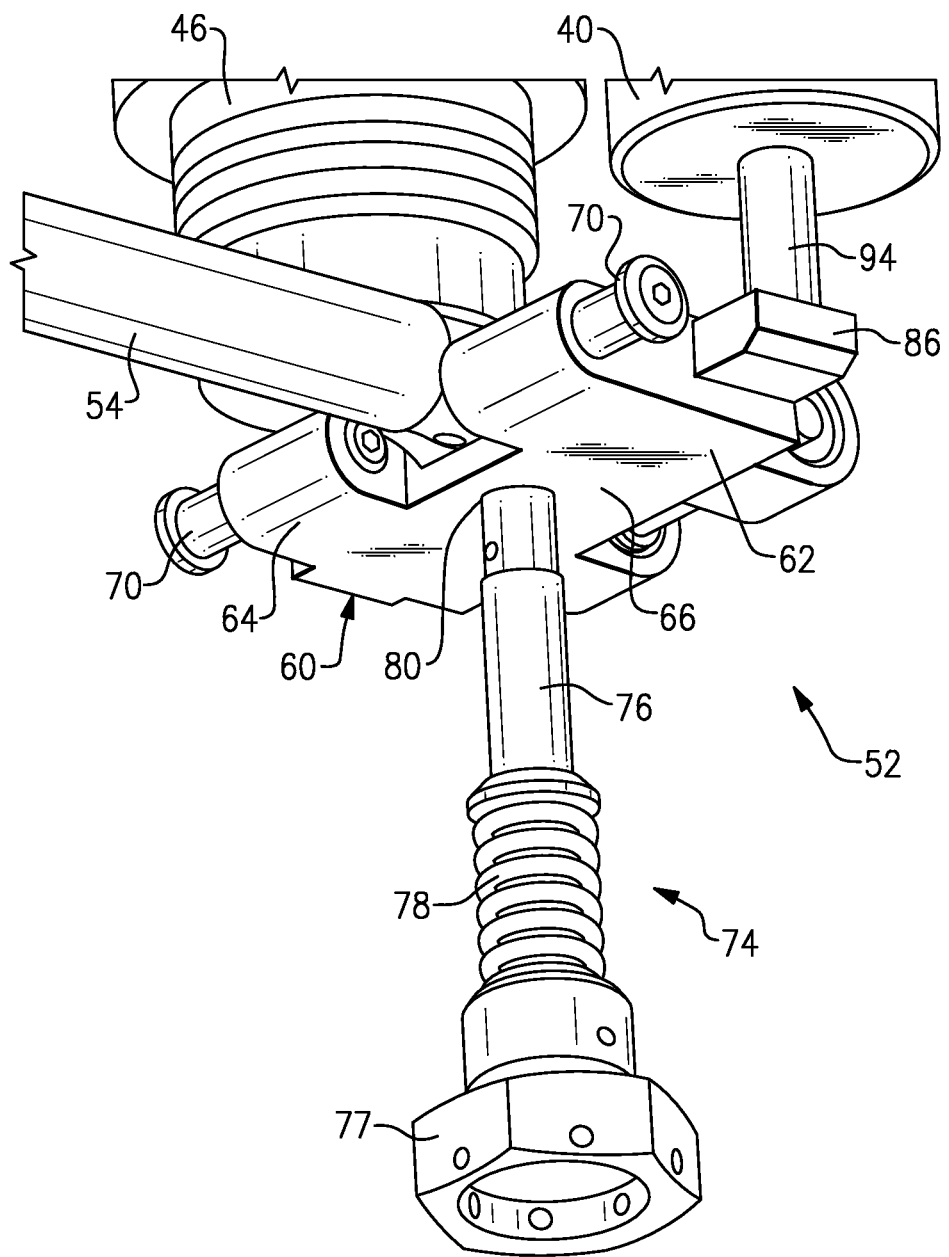
FIG. 3 is bottom perspective view of a latch assembly shown in FIG. 2.
Figure 4:
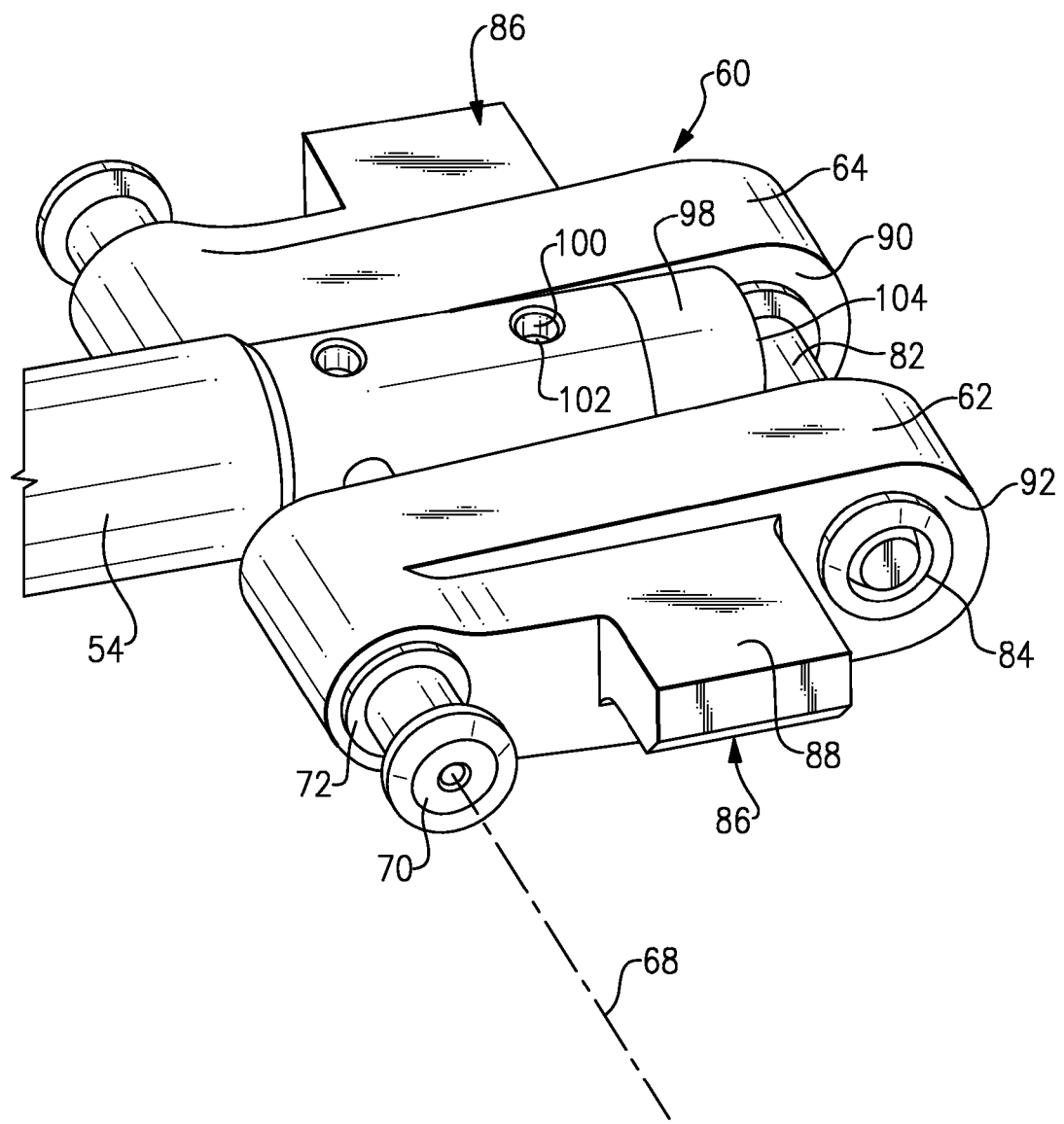
FIG. 4 is a top perspective view of the latch assembly shown in FIG. 3, but without a biasing member shown.

Referring to FIGS. 3 and 4, the latch assembly 52 includes a lever block 60 having first and second lateral walls 62, 64 spaced apart from one another. A bridge wall 66 interconnects the first and second lateral walls 62, 64 to provide an H-shaped integral member formed from a unitary block, such as 4340 hardened steel. The lever block 60 provides a pivot axis 68 at one end defined by pivot pins 70 constructed from hardened steel, for example. Each pivot pin 70 is supported in one of the first and second lateral walls 62, 64 by a pivot bearing 72, which permits the lever block 60 to rotate easily in response to input from the solenoids 40.

A recock mechanism 74 includes a plunger 76 urged toward a recock surface 80 on the bridge wall 66 by a biasing spring 78. The biasing spring 78 acts against a plug 77 received in the housing 32 (FIG. 2) and the plunger 76. The recock mechanism 74 maintains the lever block 60 in the latched condition until acted upon by the solenoids 40.

A latch pin 82 is supported by the first and second lateral walls 62, 64 on an end opposite the pivot axis 68. Ends of the latch pin 82 are supported by the block 60 with pin bearings 84. As a result, the latch pin 82 is permitted to roll against the lock bolt 54 as the lever block 60 rotates. The pivot bearings 72 and pin bearings 84 may be provided by needle bearings in one example.

The lever block 60 includes ears 86 extending from outer sides 92 of the first and second lateral walls 62, 64. The bridge wall 66 interconnects to inner sides 90 of the first and second lateral walls 62, 64. Each of the ears 86 provides a deploy surface 88 that is arranged on an opposite side of the lever block 60 from the recock surface 80. The solenoids 40 each include a rod 94 having an end 96 that engages and pushes directly on the deploy surface 88. The ends 96 are radiused or spherical to reduce the friction between the rod 94 and the ears 86.

The lock bolt 54 includes an insert 98 secured to an end of the lock bolt shaft. In one example, the insert 98 is provided hardened steel. The insert 98 abuts the latch pin 82 and includes a radius to initiate self energizing release. The lock bolt 54 includes a hole 100 receiving a pin 102 that secures the insert 98 to the lock bolt shaft.

The deploy solenoid 40 is actuated to initiate the deploy sequence within the actuator 24. In operation, to initiate the deploy sequence, the deploy solenoid 40 pushes against the latch assembly 52. The lever block 60 is rotated about the pivot axis 68, and the latch pin 82 rolls along the insert 98. The lock bolt 54 is forced to move axially to the right in FIG. 2 by a lock bolt spring 56 arranged between the piston rod 34 and the lock bolt 54. The new position of the roller assembly 58 permits the up-lock wedges 48 to move radially inward and disengage from the end of the cylinder 36. The deploy spring 38 is then able to urge the cylinder axially relative to and away from the housing 32 to the deployed position shown in FIG. 1. The down-lock wedges 50 limits the axial travel of the cylinder 36 relative to the piston rod 34.

Although an example embodiment has been disclosed, a worker of ordinary skill in this art would recognize that certain modifications would come within the scope of the claims. For that reason, the following claims should be studied to determine their true scope and content.

What is claimed is:

1. A latch assembly for a RAT actuator comprising:
   a lock bolt that includes a terminal end with a face;
   a lever block having spaced apart first and second lateral walls interconnected to one another by a bridge wall, the first and second lateral walls providing a pivot axis at one end, the lever block configured to rotate about the pivot axis between retracted and deployed positions;
   a latch pin at another end opposite the one end, the latch pin extending between the first and second lateral walls; and
   a latch bearing arranged in each of the first and second lateral walls, each bearing receiving an end of the latch pin and configured to permit the latch pin to rotate relative to the lever block, the face engaging the latch pin at a lateral location between the latch bearings, the face configured to slide across the latch pin and roll the latch pin along the face of the terminal end when the lever block rotates about the pivot axis between the retracted and deployed positions.

2. The latch assembly according to claim 1, comprising a pivot pin provided in each of the first and second lateral walls, the pivot pins providing the pivot axis.

3. The latch assembly according to claim 2, comprising pivot bearings supporting the pivot pins in the lever block.

4. The latch assembly according to claim 3, wherein the latch bearing and the pivot bearings are needle bearings.

5. The latch assembly according to claim 2, wherein the pivot pins and latch pin are hardened steel.

6. The latch assembly according to claim 1, wherein the lever block includes an ear extending from each of the first and second lateral walls on a side opposite the bridge wall, each ear providing a deploy surface configured to cooperate with a solenoid.

7. The latch assembly according to claim 6, wherein the bridge wall provides a recock surface opposite the deploy surfaces and that is configured to cooperate with a recock mechanism.

8. A latching system for a RAT actuator comprising:
   a housing;
   a lock bolt that includes a terminal end with a face;
   a lever block arranged within the housing and having first and second lateral walls interconnected to one another by a bridge wall, the first and second lateral walls providing a pivot axis at one end, the lever block configured to rotate about the pivot axis between retracted and deployed positions, the lever block providing a deploy surface;
   a latch pin at another end opposite the one end, the latch pin extending between the first and second lateral walls;
   a latch bearing arranged in each of the first and second lateral walls, each bearing receiving an end of the latch pin and configured to permit the latch pin to rotate relative to the lever block, the face engaging the latch pin at a lateral location between the latch bearings, the face configured to slide across the latch pin and roll the latch pin along the face of the terminal end when the lever block rotates about the pivot axis between the retracted and deployed positions;
   a solenoid mounted to the housing and including a rod having an end that engages the deploy surface, the solenoid configured to push the lever block about the pivot axis from the retracted position to the deployed position during a deploy sequence.

9. The latching system according to claim 8, wherein the latch bearing rotationally supporting the latch pin relative to the lever block.

10. The latching system according to claim 9, wherein the lock bolt includes an insert secured to the lock bolt, the insert provides the face and engages the latch pin.

11. The latching system according to claim 10, wherein the face is radiused and is provided by a nitrided steel.

12. The latching system according to claim 8, comprising a recock mechanism engaging the bridge wall.

13. The latching system according to claim 8, wherein the lever block includes an ear extending from each of the first and second lateral walls on a side opposite the bridge wall, the ears providing the deploy surface.

14. The latching system according to claim 13, wherein the solenoid rod end includes a radiused surface.

15. The latching system according to claim 8, comprising a pivot pin provided in each of the first and second lateral walls, the pivot pins providing the pivot axis, and pivot bearings supporting the pivot pins in the lever block.

* * * * *